United States Patent
Rozas et al.

(10) Patent No.: US 7,380,096 B1
(45) Date of Patent: *May 27, 2008

(54) SYSTEM AND METHOD FOR IDENTIFYING TLB ENTRIES ASSOCIATED WITH A PHYSICAL ADDRESS OF A SPECIFIED RANGE

(75) Inventors: Guillermo Rozas, Los Gatos, CA (US); Alexander Klaiber, Mountain View, CA (US); H. Peter Anvin, San Jose, CA (US); David Dunn, Sammamish, WA (US)

(73) Assignee: TRANSMETA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/449,950

(22) Filed: Jun. 8, 2006

Related U.S. Application Data

(63) Continuation of application No. 10/629,031, filed on Jul. 28, 2003, now Pat. No. 7,149,872.

(60) Provisional application No. 60/486,629, filed on Jul. 10, 2003.

(51) Int. Cl.
G06F 12/00 (2006.01)

(52) U.S. Cl. .................. 711/205; 711/207; 711/221

(58) Field of Classification Search ............. 711/205, 711/207, 221
See application file for complete search history.

(56) References Cited

U.S. PATENT DOCUMENTS

| 5,787,494 | A | 7/1998 | DeLano et al. |
| 5,956,753 | A | 9/1999 | Glew et al. |
| 6,226,732 | B1 | 5/2001 | Pei et al. |
| 6,341,324 | B1 | 1/2002 | Caulk et al. |
| 6,658,549 | B2 | 12/2003 | Wilson et al. |
| 6,912,644 | B1 | 6/2005 | O'Connor et al. |
| 7,149,872 | B2 * | 12/2006 | Rozas et al. ............... 711/202 |

* cited by examiner

*Primary Examiner*—Brian Peugh

(57) ABSTRACT

A system and method for identifying a TLB entry having a physical address that is within a specified range are disclosed. The method includes obtaining a tentative TLB entry from a page table entry and accessing a physical address associated with the tentative TLB entry. The method further includes comparing the physical address of the tentative TLB entry with a predetermined range of addresses. If the physical address is within the finite range of addresses, an exception is invoked. In response to the exception, the physical address and/or an attribute of the tentative TLB entry can be modified. The tentative TLB entry can then be stored in a TLB.

21 Claims, 5 Drawing Sheets

SYSTEM AND METHOD FOR IDENTIFYING TLB ENTRIES ASSOCIATED WITH A PHYSICAL ADDRESS OF A SPECIFIED RANGE

CROSS REFERENCE TO RELATED APPLICATIONS

This patent application is a Continuation of commonly-owned U.S. patent application Ser. No. 10/629,031 now U.S. Pat. No. 7,149,872, filed on Jul. 28, 2003, entitled "A SYSTEM AND METHOD FOR IDENTIFYING PAGE TABLE ENTRIES WITH A PHYSICAL ADDRESS WITHIN A SPECIFIED RANGE", by Rozas et al., which claims priority to the co-pending U.S. Provisional Patent Application No. 60/486,629 entitled "A SYSTEM AND METHOD FOR IDENTIFYING PAGE TABLE ENTRIES WITH A PHYSICAL ADDRESS WITHIN A SPECIFIED RANGE" by Guillermo Rozas et al., filed Jul. 10, 2003, which are incorporated herein by reference.

TECHNICAL FIELD

Embodiments of the present invention relate to the field of memory management. Specifically, embodiments of the present invention relate to a system and method for creating TLB entries.

BACKGROUND OF THE INVENTION

Embodiments of the present invention relate to the field of memory management. Specifically, embodiments of the present invention relate to a system and method for creating TLB entries.

SUMMARY OF THE INVENTION

What is needed is a system and method for identifying translation lookaside buffer (TLB) entries that contain a physical address that resides within a predetermined address range. What is also needed is a system and method for allowing the modification of a tentative TLB entry such that the physical address and/or TLB entry attributes (e.g., cacheability) may be altered before the entry is stored in the TLB.

Embodiments of the present invention may be used within circuitry that is responsible for TLB entry generation and storage. Specifically, there are a number of cases, wherein it is desirable to identify tentative TLB entries that have a physical address falling within a predetermined memory range and take some action in response thereto.

A system and method for identifying a TLB entry having a physical address that is within a specified range are disclosed. The method includes obtaining a tentative TLB entry from a page table entry and accessing a physical address associated with the tentative TLB entry. The method further includes comparing the physical address of the tentative TLB entry with a predetermined range of addresses. If the physical address is within the finite range of addresses, an exception is invoked. In response to the exception, the physical address and/or an attribute of the tentative TLB entry can be modified. The tentative TLB entry can then be stored in a TLB.

A computer system is also described in accordance with the above described method embodiments.

DETAILED DESCRIPTION OF THE INVENTION

A system and method for identifying tentative TLB entries comprising a physical address within a specified range is disclosed. Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. In other instances, well-known components, circuits, methods, materials, and procedures have not been described in detail so as not to unnecessarily obscure aspects of the present invention. Embodiments of the present invention are discussed primarily in the context of a method for identifying TLB entries that have a physical address within a specified address range.

Figure 5:
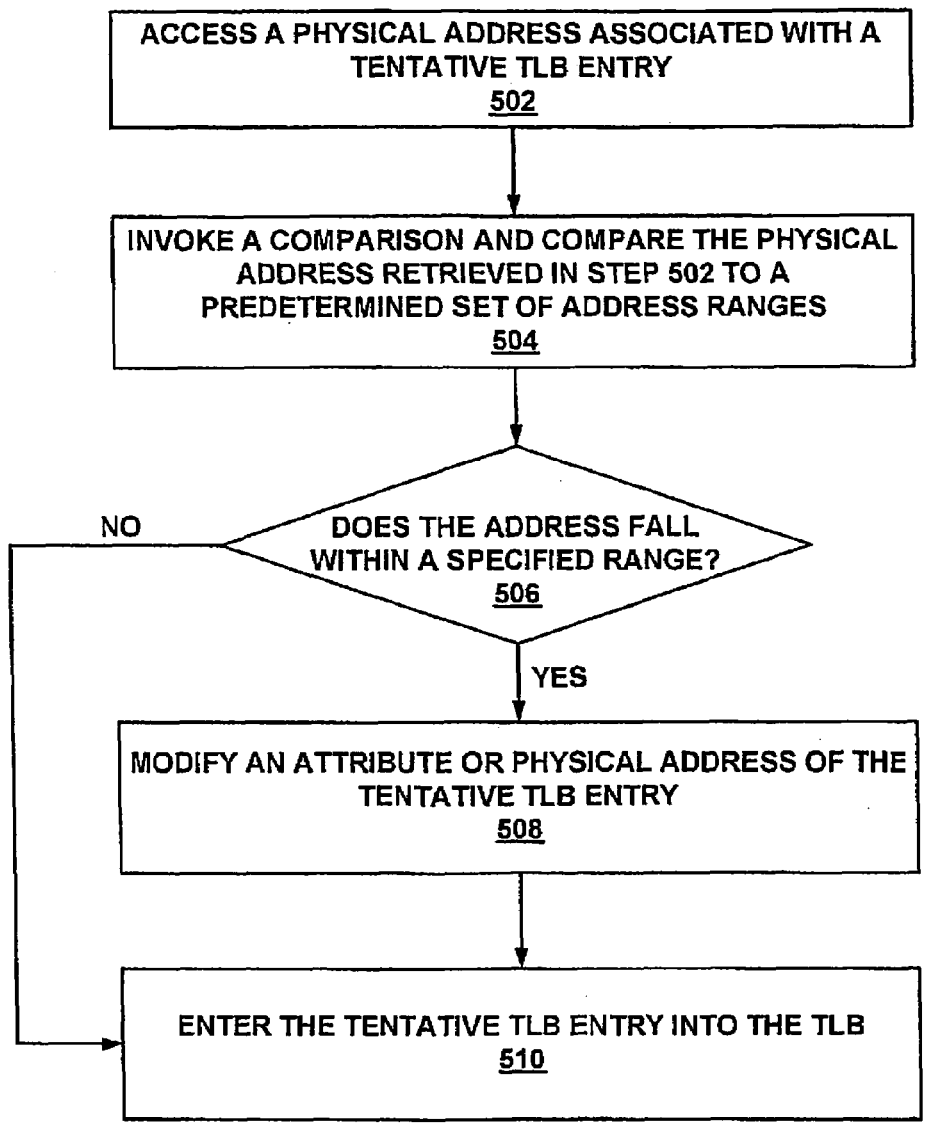
FIG. 5 is a flow diagram of an exemplary process for determining if a tentative TLB has a physical address that falls within an address range specified by a finite number of range registers in accordance with an embodiment of the present invention.

Certain portions of the detailed descriptions of embodiments of the invention, which follow, are presented in terms of processes and methods (e.g., processes 500 of FIG. 5). Although specific steps are disclosed herein describing the operations of these processes and methods, such steps are exemplary. That is, embodiments of the present invention are well suited to performing various other steps or variations of the steps and/or order of steps recited in the flowcharts of the figures herein.

In one embodiment, such processes are carried out by processors and electrical/electronic components under the control of computer readable and computer executable instructions comprising code contained in a computer usable medium. The computer readable and computer executable instructions reside, for example, in code within a computer usable medium and used in the processor, data storage features, memory, registers and other components of a computer system performing the method for maintaining sufficient bandwidth on a network link during failures. However, the computer readable and computer executable instructions may reside in any type of computer readable medium.

Exemplary Memory Design

A typical multiple storage level memory design is characterized by a hierarchy of three levels, including a cache level, a main memory, and a backing storage, such as a disc, flash drive, or other storage medium. A table corresponds to the cache and is managed transparently by hardware for the operating system (OS). The table contains a working set of recently program-referenced localities (e.g., lines) of the main memory.

Caching and paging mechanisms support efficient memory management. In paging, the OS fetches fixed size (e.g., 4,096 bytes) blocks called pages from the backing storage into the main memory as required by the processor (e.g., on demand). Physical memory is divided into page frames of a fixed size. The real (e.g., physical) address is used to access cache and main memory. The least significant 12 bits of the real address apply to a particular location in a page.

The upper bits of a real address apply to the page table, which determines if the corresponding partial page resides within the memory and translates the upper bits if it is present. The page table thus translates a page number into a frame number corresponding to the actual physical location of the associated information within the memory. A page table entry (PTE) associates a page number with a frame number. The page table resides within the memory.

The memory system thus generates a virtual effective address for cached data, translates the virtual address into a "real" address corresponding to its physical address in the main memory, and uses the real address to access the memory system. As the page table which performs the virtual-to-real (and e.g., real-to-virtual) address translations typically reside in the memory, the time such translations require adds to memory latency.

To make the translation process more efficient and thus reduce latency, a translation lookaside buffer (TLB) can be used. Typical TLBs comprise a register system with multiple entries (e.g., 64-256, etc.). Thus, a TLB functions as a fast, small cache within the processor with pointers to memory pages. Several bits comprising a virtual address become an address with the TLB. An entry corresponding to this TLB address points to the memory location.

A TLB entry includes the real address, the real upper portion of the physical memory address, and residual bits of the virtual address that are mapped to the pointed-to memory location. The residual bits are compared to the corresponding bits of the virtual reference so as to ensure selecting the correct entry. The TLB provides real addresses used by the cache by translating virtual addresses provided by the processor into real addresses.

Exemplary Computer System

Figure 1:
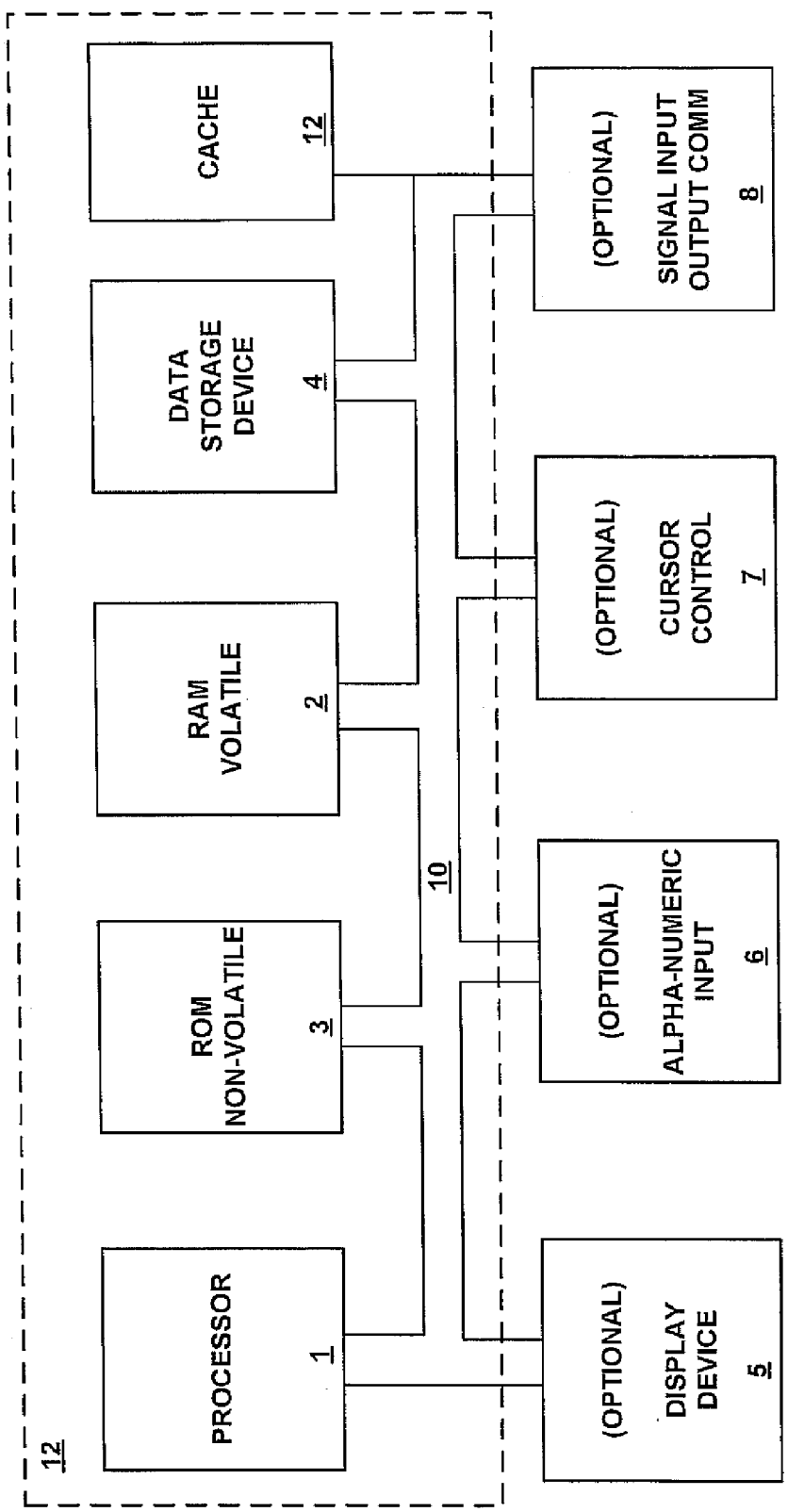
FIG. 1 is a logical block diagram of an exemplary embedded computer system in accordance with embodiments of the present invention.

Referring now to FIG. 1, a block diagram of exemplary computer system 12 is shown. It is appreciated that computer system 12 of FIG. 1 described herein illustrates an exemplary configuration of an operational platform upon which embodiments of the present invention can be implemented. Nevertheless, other computer systems with differing configurations can also be used in place of computer system 12 within the scope of the present invention. For example, computer system 12 could be a server system, a personal computer or an embedded computer system.

Computer system 12 includes an address/data bus 10 for communicating information, a central processor 1 coupled with bus 10 for processing information and instructions, a cache 12 coupled to bus 10 for temporarily storing data, a volatile memory unit 2 (e.g., random access memory, static RAM, dynamic RAM, etc.) coupled with bus 10 for storing information and instructions for central processor 1 and a non-volatile memory unit 3 (e.g., read only memory, programmable ROM, flash memory, EPROM, EEPROM, etc.) coupled with bus 10 for storing static information and instructions for processor 1. Computer system 12 may also contain an optional display device 5 coupled to bus 10 for displaying information to the computer user. Moreover, computer system 12 also includes a data storage device 4 (e.g., disk drive) for storing information and instructions.

Also included in computer system 12 of FIG. 1 is an optional alphanumeric input device 6. Device 6 can communicate information and command selections to central processor 1. Computer system 12 also includes an optional cursor control or directing device 7 coupled to bus 10 for communicating user input information and command selections to central processor 1. Computer system 12 also includes signal communication interface 8, which is also coupled to bus 10, and can be a serial port.

Figure 2:
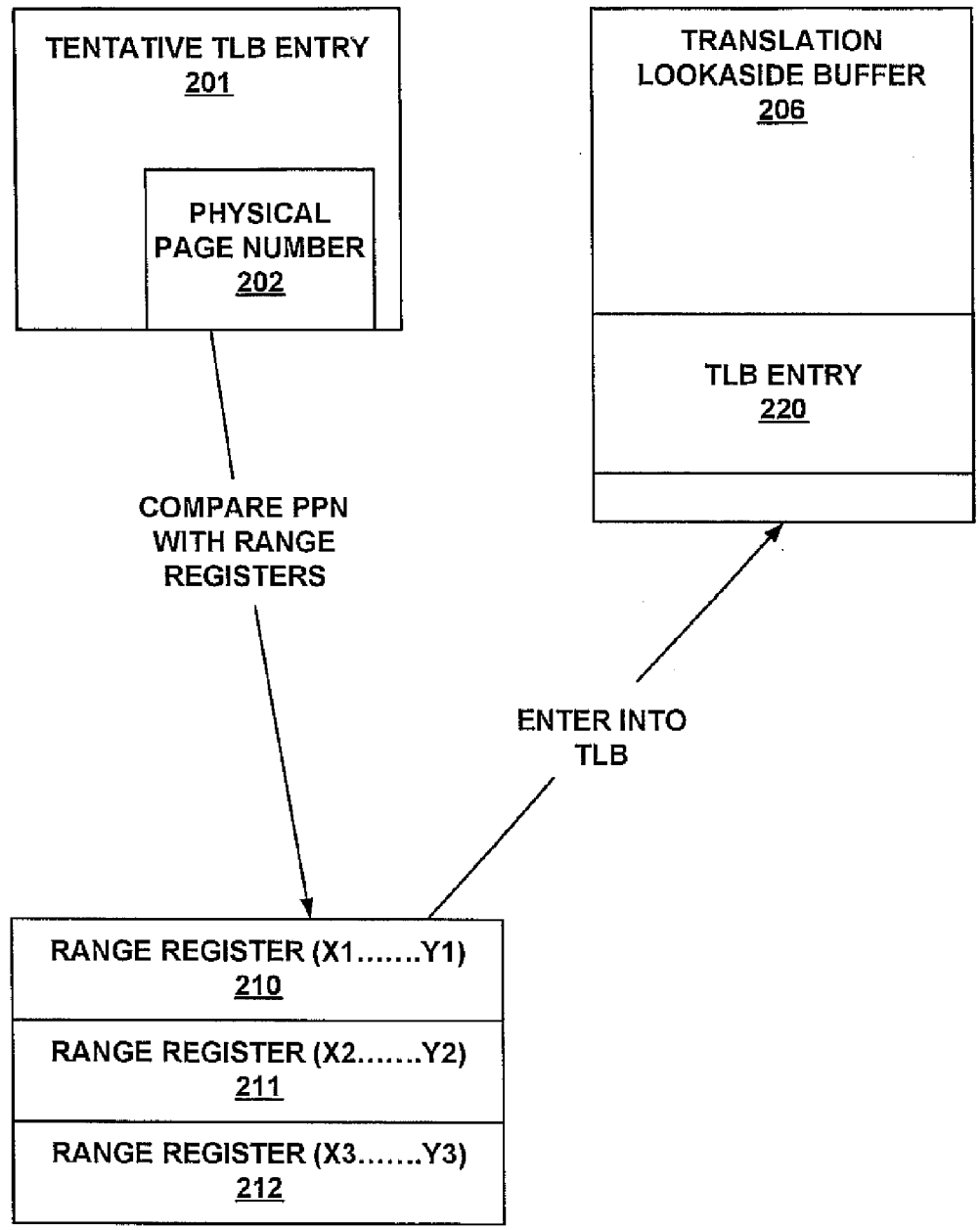
FIG. 2 is a block diagram of an exemplary tentative TLB entry, a TLB and a plurality of range registers in accordance with an embodiment of the present invention.

FIG. 2 is a block diagram 200 of an exemplary tentative TLB entry 201, a TLB 206 and a plurality of range registers 210, 211, and 212 in accordance with embodiments of the present invention. The translation lookaside buffer (TLB) 206 comprises a plurality of TLB entries (e.g., TLB entry 220). In accordance with embodiments of the present invention, a "tentative" TLB entry is a TLB entry before it is entered into the TLB. In accordance with embodiments of the present invention, a tentative TLB entry can be created from contents of a page table entry (PTE) or can be supplied from other means. It is appreciated that a PTE can be accessed from many sources, one of which is a page table.

Embodiments of the present invention provide a system and method for identifying tentative TLB entries that contain or have associated with them a physical page number (e.g., physical address) 202 that falls within in a range specified by range registers. Each of the range registers specifies a unique range of memory addresses. For example, range register 210 specifies a range from x1 to y1. Identifying a tentative TLB entry and modifying the tentative TLB entry before it is entered into the translation lookaside buffer (TLB) can be used to handle special cases where conventional mechanisms for entering TLB entries do not work. The present invention comprises an architecture that includes a finite number of range registers (e.g., range registers 210, 211, and 212). The range registers specify the address ranges for which an exception can be invoked during the construction and insertion of a tentative TLB entry into a TLB.

In one embodiment of the invention, as the tentative TLB entry is constructed, the physical address of the tentative TLB entry is examined to see if it falls within the address range specified by range registers. If a tentative TLB entry has a physical page number (e.g., physical address) that falls within the ranges specified by the range registers, an exception is invoked and modification of the tentative TLB entry can be performed. If the physical address lies outside the predetermined ranges, then the tentative TLB entry can be stored into the TLB without modification.

In one embodiment of the invention, the physical page number 202 (e.g., physical address) associated with the tentative TLB entry 201 is compared to the address ranges specified by the range registers 210, 211, and 212. If the physical address is within the address ranges specified by the range registers, an exception is invoked and the physical address and/or an attribute of the tentative TLB entry is modified. Once the tentative TLB entry is modified, the tentative TLB is entered into the translation lookaside buffer 106. In one embodiment of the invention, the physical address of the tentative TLB entry is modified. In another embodiment of the invention, an attribute (e.g., cacheability) of the tentative TLB entry is modified. Out of range entries are stored in the TLB without modification.

Figure 3:
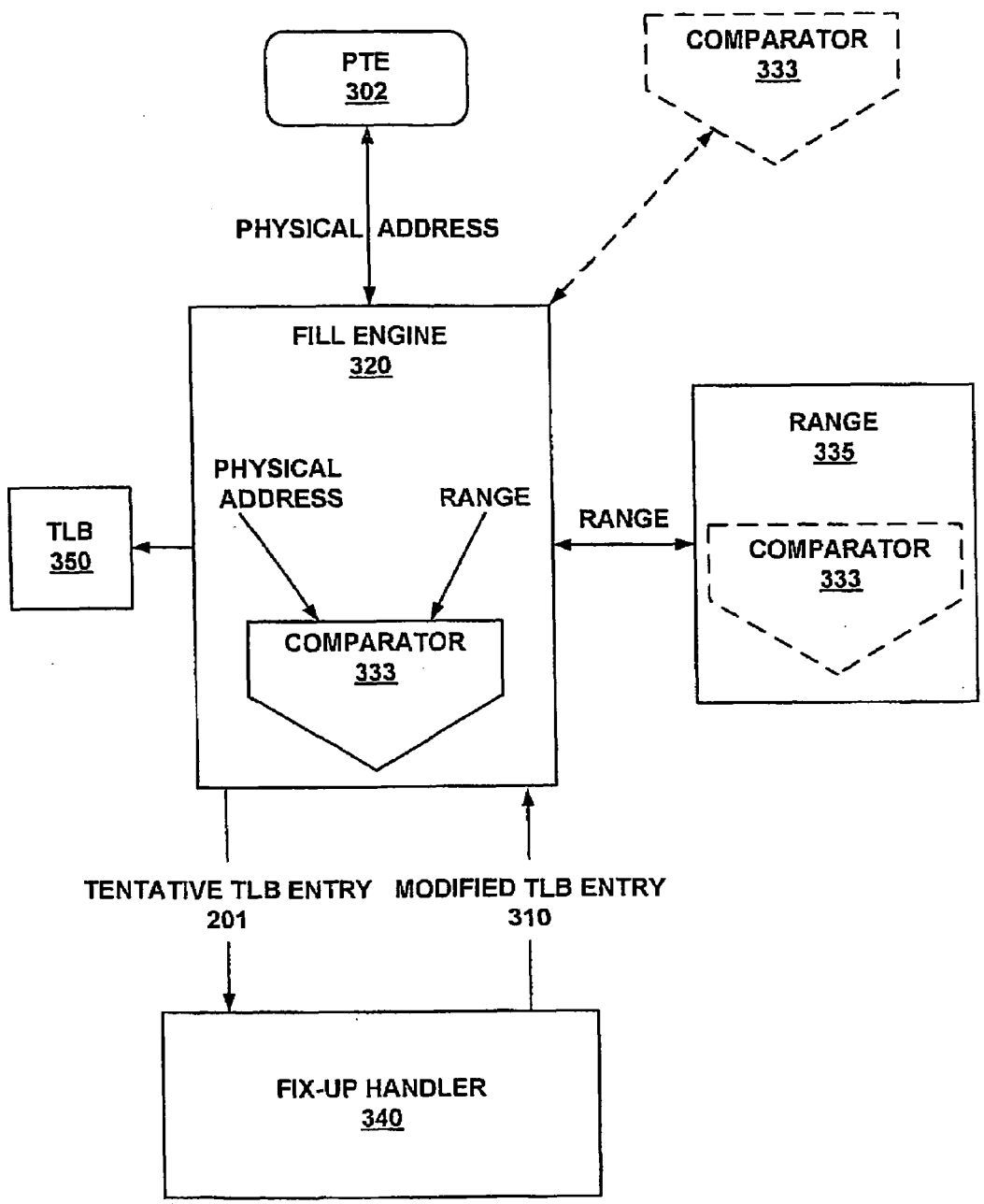
FIG. 3 is a block diagram of an exemplary circuit for creating a TLB entry in a TLB in accordance with an embodiment of the present invention.

FIG. 3 is a block diagram of an exemplary circuit 300 for creating and inserting a TLB entry in a translation lookaside buffer 350. System 300 includes a fill engine 320 for accessing a PTE 302, constructing a tentative TLB entry 201 and invoking a comparison between the physical address of the tentative TLB entry and a predetermined range of physical memory addresses 335. System 300 also includes a comparator 333 coupled to the fill engine 320 for comparing the physical memory address of the tentative TLB entry 201 and range 335. In one embodiment of the invention, comparator 333 may reside in fill engine 320. In another embodiment of the invention, the comparator may reside in the range register 335 or may be coupled to fill engine 320 externally.

The comparator 333 compares the physical address and the specified range and then determines a match. System 300 also includes a fix-up handler 340 coupled to the comparator 333 and to the fill engine 320 for handling an exception generated by the comparator 333 in response to the comparator 333 determining that the physical memory address associated with the tentative TLB entry 201 is within the predetermined range 335. In response to the exception, the fix-up handler 340 modifies the physical address and/or an attribute of the tentative TLB entry 201 and creates a modified tentative TLB entry 310. The modified tentative TLB entry 310 is then inserted in the TLB 350 by the fill engine 320. Tentative TLB entries having a physical address outside the ranges are stored in the TLB by the fill engine 320 without modification. It is appreciated that the fix-up handler 340 can be implemented in hardware or software.

Figure 4:
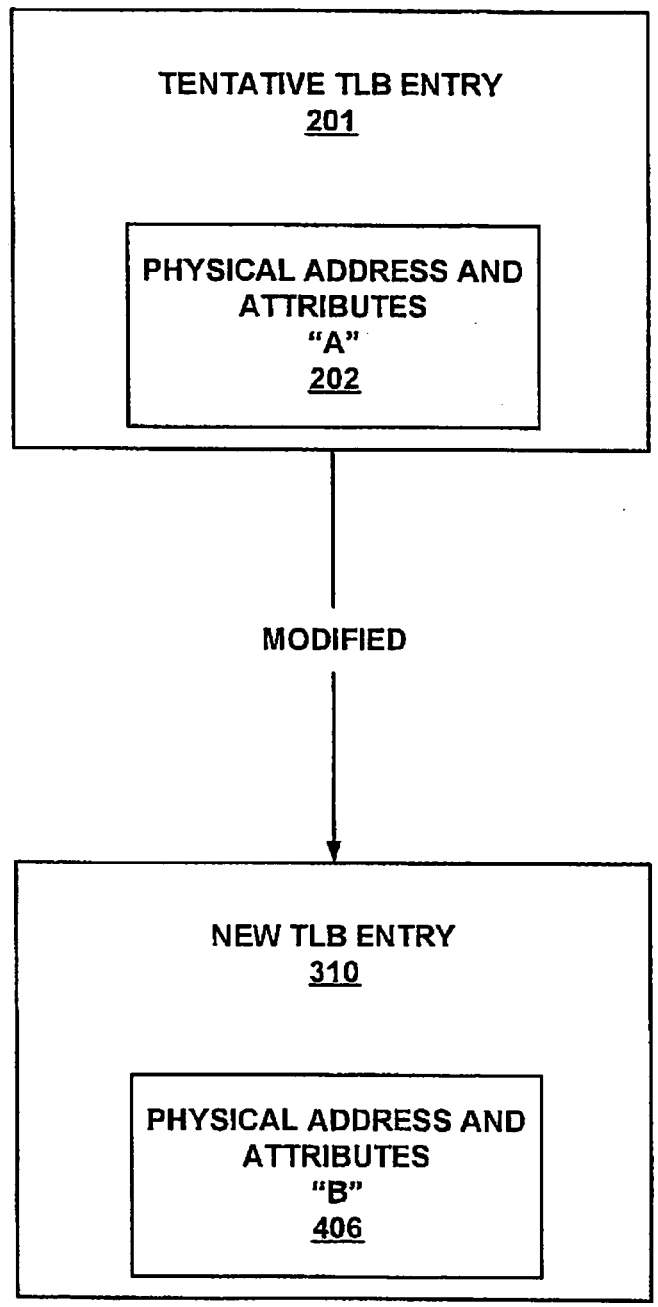
FIG. 4 is a block diagram of an exemplary tentative TLB entry and a modified TLB entry in accordance with an embodiment of the present invention.

FIG. 4 is a block diagram of an exemplary tentative TLB entry and a new (e.g., modified) tentative TLB entry in accordance with embodiments of the present invention. Tentative TLB entry 201 comprises a physical address and attributes "A" 202. After a match, an exception is invoked by the comparator and the fix-up handler 340 of FIG. 3 modifies an attribute or physical address of the tentative TLB entry according to an implementation of the exception invoked. It is appreciated that the attribute modified by the fix-up handler can be a physical memory address or any other attribute associated with the TLB entry, such as cacheability permissions or read/write permissions. After the tentative TLB entry 201 is modified, a new page table entry 310 is created comprising modified physical address and attributes "B" 406. The modified TLB entry is then inserted in the TLB by the fill handler.

FIG. 5 is a flow diagram of an exemplary process 500 for determining if a tentative TLB entry has a physical address that falls within an address range specified by range registers in accordance with embodiments of the present invention. It is appreciated that the steps performed in process 500 can be implemented in hardware or software. Process 500 begins with step 502, accessing a physical address associated with a tentative TLB entry. The next step 504 is to invoke a comparison and compare the physical address retrieved in step 502 to a predetermined set of address ranges. A match is determined in step 506.

If the physical address is not within the ranges specified by the range registers, the tentative TLB entry is entered into the TLB in step 510. If the physical address is determined to be within the ranges of the range registers, in step 508, the tentative TLB entry is modified in any way appropriate to that particular use of the range register. Any number of modifications can be performed in step 508, depending on the convention of the range register. Any number of modifications can be performed in step 508, depending on the specific needs of the embodiment.

For example, the physical page number can be modified to a remapped address. Or, in another case, the cacheability of the tentative TLB can be modified by altering an attribute of the tentative TLB entry. In one embodiment of the invention, any aspect of the tentative TLB can be modified before it is entered into the TLB. The modifications of the tentative TLB entry can be specific to any number of conditions. Once the tentative TLB is modified, the modified tentative TLB entry is entered into the TLB.

Exemplary Implementations of the Present Invention

Embodiments of the present invention relate to the creation of a TLB entry. Specifically, there are a number of cases where it is desirable to identify and modify TLB entries that have a physical address that resides in a predetermined address range specified by a range register before the TLB entry is stored in the TLB.

One exemplary case occurs when using part of an interrupt controller that is architecturally mapped into the memory address space (e.g., a memory map device) residing at a movable address. One such interrupt controller is an APIC (Advanced Programmable Interrupt Controller). An APIC is a special-purpose integrated circuit that functions as an overall manager in an interrupt driven system. The circuit accepts requests from the peripheral equipment, determines which of the incoming requests is of the highest priority, ascertains whether the incoming request has a higher priority value than the level currently being serviced, and issues an interrupt to the CPU based on this determination. The APIC is mapped in memory in a way that does not allow the use of conventional mechanisms for creating a TLB entry if that TLB entry has a physical page number within the range of the APIC.

Another exemplary case regarding an address space is graphics related, such as when using a GART (Graphics Address Remapping Table). A GART is a memory-based table that specifies an address range in which physical addresses coming from the processor get remapped to a contiguous range of physical memory. A GART is mapped in a way that does not allow the use of conventional mechanisms for creating a TLB entry if that TLB entry has a physical page number within the range of the GART.

In one embodiment of the present invention, specific implementations of identifying a TLB entry that resides in a finite memory range are specific to code morphing software (CMS). In one implementation, code-morphing software is designed to translate x86 instructions into VLIW (very long instruction word) instructions for the underlying hardware engine. In one embodiment of the invention, identifying tentative TLB entries comprising a physical memory address within a specified memory range improves performance of the code morphing software.

Embodiments of the present invention, a system and method for identifying a TLB entry with a physical page number that is within a specified range has been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of managing a translation lookaside buffer, said method comprising:
   identifying tentative translation lookaside buffer entries not entered into said translation lookaside buffer and which fall within a predetermined physical memory range;
   for each identified tentative translation lookaside buffer entry that falls within said predetermined physical memory range, invoking an exception; and
   for each identified tentative translation lookaside buffer entry that falls outside said predetermined physical memory range, causing said identified tentative translation lookaside buffer entry to be stored in said translation lookaside buffer.

2. The method as recited in claim 1 wherein said invoking an exception comprises:
   modifying said tentative translation lookaside buffer entry.

3. The method as recited in claim 2 wherein said invoking an exception further comprises:
   storing said modified translation lookaside buffer entry into said translation lookaside buffer.

4. The method as recited in claim 2 wherein a physical memory address of said tentative translation lookaside buffer entry is modified by said modifying.

5. The method as recited in claim 2 wherein an attribute of said tentative translation lookaside buffer entry is modified by said modifying.

6. The method as recited in claim 2 wherein a physical memory address and an attribute of said tentative translation lookaside buffer entry are modified by said modifying.

7. The method as recited in claim 1 wherein said identifying tentative translation lookaside buffer entries comprises:
   creating said tentative translation lookaside buffer entries based on a page table.

8. A computer-readable medium comprising instructions stored therein for performing a method of managing a translation lookaside buffer, said method comprising:
   identifying tentative translation lookaside buffer entries not entered into said translation lookaside buffer and which fall within a predetermined physical memory range;
   for each identified tentative translation lookaside buffer entry that falls within said predetermined physical memory range, invoking an exception; and
   for each identified tentative translation lookaside buffer entry that falls outside said predetermined physical memory range, causing said identified tentative translation lookaside buffer entry to be stored in said translation lookaside buffer.

9. The computer-readable medium as recited in claim 8 wherein said invoking an exception comprises:
   modifying said tentative translation lookaside buffer entry.

10. The computer-readable medium as recited in claim 9 wherein said invoking an exception further comprises:
    storing said modified translation lookaside buffer entry into said translation lookaside buffer.

11. The computer-readable medium as recited in claim 9 wherein a physical memory address of said tentative translation lookaside buffer entry is modified by said modifying.

12. The computer-readable medium as recited in claim 9 wherein an attribute of said tentative translation lookaside buffer entry is modified by said modifying.

13. The computer-readable medium as recited in claim 9 wherein a physical memory address and an attribute of said tentative translation lookaside buffer entry are modified by said modifying.

14. The computer-readable medium as recited in claim 8 wherein said identifying tentative translation lookaside buffer entries comprises:
    creating said tentative translation lookaside buffer entries based on a page table.

15. A computer system comprising:
    a memory comprising a plurality of instructions; and
    a processor for executing said instructions to perform a method of managing a translation lookaside buffer, said method comprising:
    identifying tentative translation lookaside buffer entries not entered into said translation lookaside buffer and which fall within a predetermined physical memory range;
    for each identified tentative translation lookaside buffer entry that falls within said predetermined physical memory range, invoking an exception; and
    for each identified tentative translation lookaside buffer entry that falls outside said predetermined physical memory range, causing said identified tentative translation lookaside buffer entry to be stored in said translation lookaside buffer.

16. The computer system as recited in claim 15 wherein said invoking an exception comprises:
    modifying said tentative translation lookaside buffer entry.

17. The computer system as recited in claim 16 wherein said invoking an exception further comprises:
    storing said modified translation lookaside buffer entry into said translation lookaside buffer.

18. The computer system as recited in claim 16 wherein a physical memory address of said tentative translation lookaside buffer entry is modified by said modifying.

19. The computer system as recited in claim 16 wherein an attribute of said tentative translation lookaside buffer entry is modified by said modifying.

20. The computer system as recited in claim 16 wherein a physical memory address and an attribute of said tentative translation lookaside buffer entry are modified by said modifying.

21. The computer system as recited in claim 15 wherein said identifying tentative translation lookaside buffer entries comprises:
    creating said tentative translation lookaside buffer entries based on a page table.

* * * * *